June 16, 1925.

A. S. BLANCO

FAUCET

Filed Feb. 2, 1925

1,542,284

Inventor:
A. S. Blanco
by Langner Parry Card & Langner
Att'ys.

Patented June 16, 1925.

1,542,284

UNITED STATES PATENT OFFICE.

AURELIO SEVILLA BLANCO, OF HABANA, CUBA.

FAUCET.

Application filed February 2, 1925. Serial No. 6,464.

*To all whom it may concern:*

Be it known that AURELIO SEVILLA BLANCO, citizen of Cuba, residing at Habana, Cuba, has invented certain new and useful Improvements in Faucets, of which the following is a specification.

The main object of this invention is to provide an improved faucet, for use on water distribution pipes.

There are many different kinds of faucets, which, as well known, are operated automatically or manually. An indispensable property of a satisfactory faucet is its lasting qualities and efficiency, not only in delivering water, but also in preventing leaking and dripping. These defects are generally due solely to poor construction or to the poor combination of the mechanical elements.

Objects of this invention, are to improve the construction and efficiency, decrease the cost of production, and prolong the life, of devices of this character.

Figure 1:
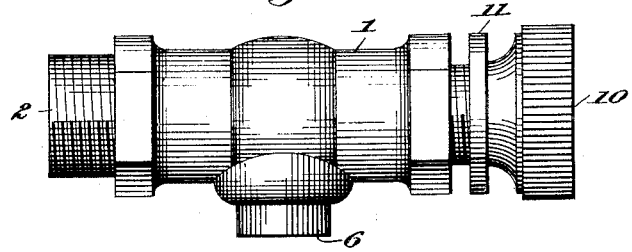
Figure 2:
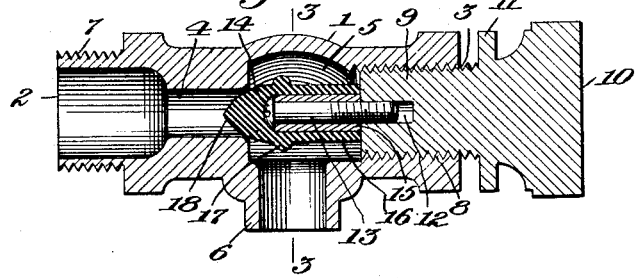
Figure 3:
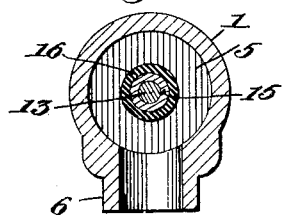

These and other advantages of the new faucet are clearly set forth in the following specification and one form of the same is shown on the accompanying drawings, wherein similar reference characters designate similar parts on the various figures, and wherein, Fig. 1 is a side elevation of the faucet, Fig. 2 is a longitudinal vertical section thereof, and Fig. 3 is a section on line 3—3 of Fig. 2.

Referring to the drawings, the faucet comprises a hollow body 1, of metal, and preferably of brass.

The passage in body 1 as shown in Fig. 2 has enlarged end portions 2 and 3.

The portion 2 extends into a portion 4 which, at the transverse center of the body expands upward at 5, and downward as shown, to form an outlet 6.

The body 1, at the end 2, is provided with outer screw threads 7, for connection with a water supply pipe.

The body 1, at the other end 3, is provided with inner screw threads 8 serving as a guide for a screw operating plug 9, provided with a hand hold 10 and a circular stop flange 11.

The plug 9 is provided with a central threaded socket 12 for receiving a threaded spindle 13 having an outwardly rounded head 14, serving as a stop for a tube 15, sleeved on 13. A rubber valve 16, having a circular flange 17 and a conical end 18, is slidingly received on tube 15.

The faucet as described is attached to a water pipe, (not shown) by its end 2.

The valve 16 is advanced to close passage 4 by rotating the plug 9 to screw it into the casing. Reverse movement of plug 9, permits the fluid pressure to open the passage 4 and permit flow from inlet 2 to outlet 6.

Having now described one form of the invention merely by way of illustration, what is claimed is:

1. A faucet comprising, a body, inlet and outlet passages therein, a threaded aperture in the body, a threaded operating plug in the aperture, a stop flange on the plug, a threaded socket in the inner end of the plug, a stem in the socket, a rounded head on the free end of the stem, a tube sleeved on the stem, and held thereon by the head, and a resilient valve head slidably received on the tube and surrounding the tube, stem, and head.

2. A faucet comprising, a body, inlet and outlet passages in the body, an operating member in the body, a valve stem mounted in the operating member, a head on the free end of the stem, a tube sleeved on the stem and held thereon by the head and a resilient valve head slidably received on the tube and surrounding the tube, stem and stem head.

3. A valve operating member, a valve stem carried by the operating member, a head on the free end of the stem, a tube sleeved on the stem and held thereon by the head and a resilient valve head slidably received on the tube and surrounding the tube, stem and stem head.

In testimony whereof I have signed my name to this specification.

AURELIO SEVILLA BLANCO.